Feb. 24, 1942. P. W. WHITE Re. 22,040
BUCKLE
Original Filed Sept. 19, 1938 2 Sheets-Sheet 1
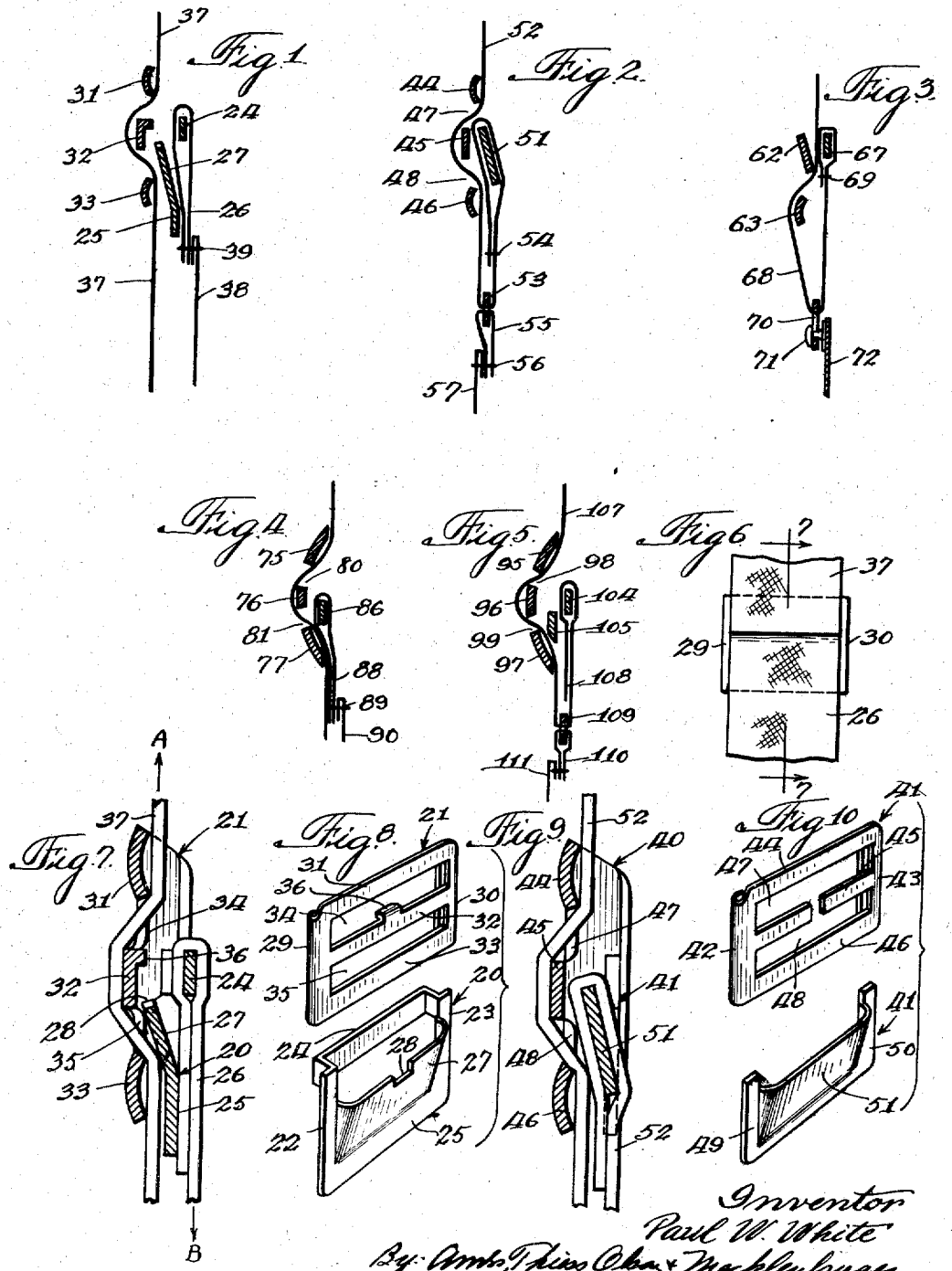
Inventor
Paul W. White
By: Amos, Pierce, Olson & Mackelburger
Attys.

Feb. 24, 1942. P. W. WHITE Re. 22,040
BUCKLE
Original Filed Sept. 19, 1938 2 Sheets-Sheet 2
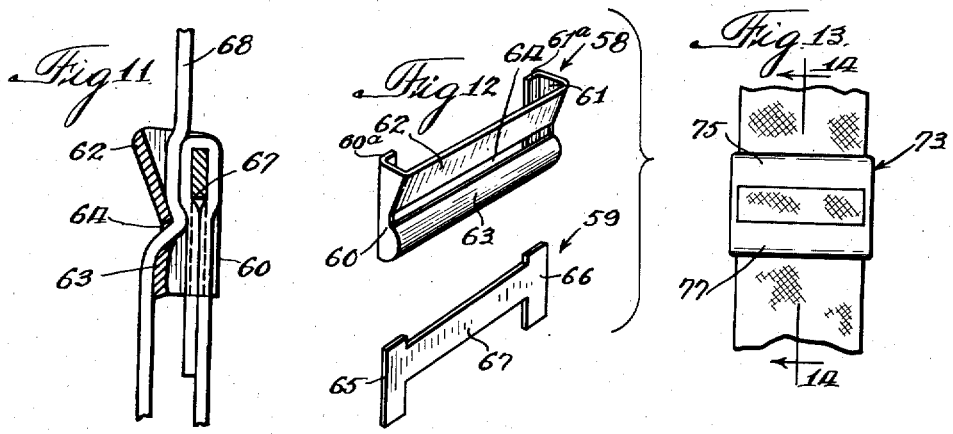
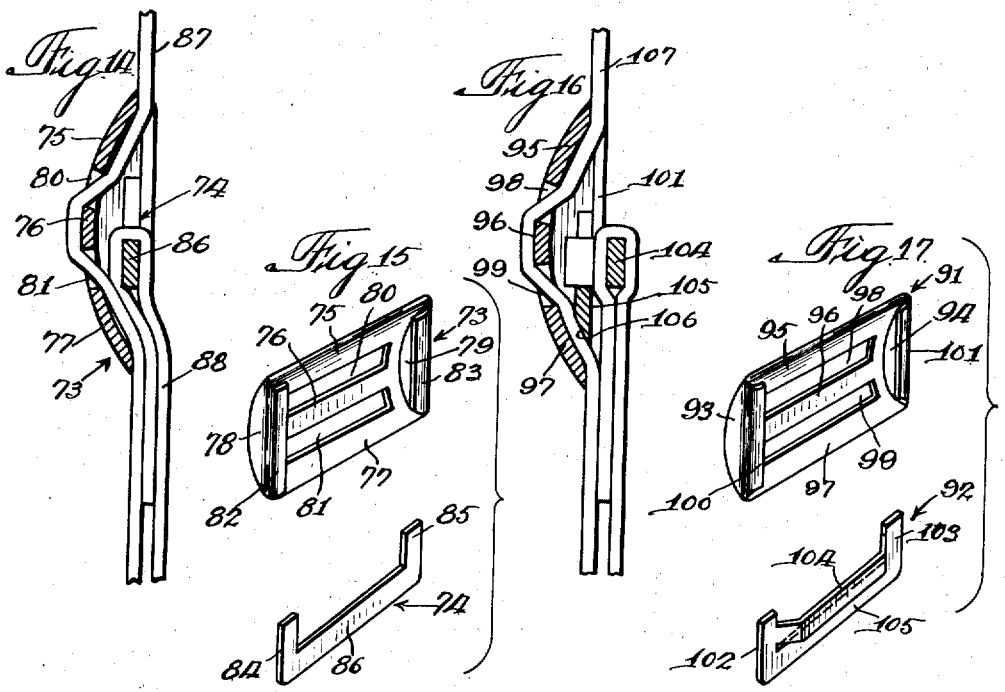
Inventor
Paul W. White.
By: Amos, Pliss, Olson & Mecklenburg
Attys.

Reissued Feb. 24, 1942

Re. 22,040

UNITED STATES PATENT OFFICE 22,040

BUCKLE

Paul W. White, Waterbury, Conn., assignor to Parva Products Company, Chicago, Ill., a corporation of Delaware Original No. 2,219,537, dated October 29, 1940, Serial No. 230,618, September 19, 1938. Application for reissue October 23, 1941, Serial No. 416,281

12 Claims. (Cl. 24—196)

This invention relates to buckles and has special reference to devices adapted to be mounted on straps, bands or the like, for the support of garments or other objects on the person.

More particularly, this invention relates to a slide buckle comprising a pair of slidably engaged frames lying in a face-to-face relation including co-operating cross bars for clamping a strap in adjusted positions therebetween upon a relative longitudinal movement of the frames, one of the co-operating cross bars having a cover of resilient material for engaging the strap.

Further, the present invention contemplates the securing of one end of a strap to a second cross bar of one of the frames, the strap passing behind the co-operating cross bar of that frame for attachment to an article to be supported or passing through a loop secured to an article to be supported with the free end of the strap passing between the co-operating cross bars to be clamped in adjusted positions.

The device of the present invention may be adapted for use in various connections and as a matter of fact the construction may be employed with slight variations not departing from the spirit of this invention universally where detachable connections are desired. Hereafter, and in the drawings, the device will be described and shown in its association with a strap for attachment to lingerie, for encircling the leg as a hose supporter, for use as a suspender, or for detachable engagement with a button extending from garments of various characters. It is, of course, to be understood that various other uses may be mentioned and this invention is not to be limited to any single specific use.

The buckles contemplated herein are adapted for use with straps or like material varying materially in thickness. Each buckle construction is so constructed that it will successfully operate on straps varying substantially one hundred per cent in thickness and will not slip over the usual wearing conditions due to a positive wedge-like grip obtained between the frame members. The grip is preferably obtained automatically by the tension applied to the strap in its use as a suspender, garter or the like, and an adjustment of the buckle on the strap may be made with little effort.

As above stated, when tension is applied to the strap a relative longitudinal movement of the frame is obtained and this movement directs co-operating bars into engagement with each other. One of the co-operating bars is provided with a cover of resilient material between which and the other co-operating bar the strap is clamped. This resilient material may be in the form of a fabric, one of the most resilient fabrics, of course, being elastic of the ordinary suspender or garter type, and one of the lesser resilient fabrics being silk or ordinary tape.

When tension is applied to the strap, the co-operating bars are wedged together and are held in that wedged condition by the continued tension of the strap, but upon release of the tension the resiliency of the strap seeks to return the co-operating bars to a position where the clamping action is not nearly so great. That is, the fabric is under compression during the period of tension on the strap and when the tension is relieved the compressed material seeks to return to a normal condition and tends to effect a separation of the co-operating cross bars. Thus, when it is desired to adjust the position of the frames of the buckle with respect to the strap, the co-operating cross bars are not locked to such a great extent that they are not readily movable and an adjustment therefore may be obtained very easily.

In the usual form of construction, an ordinary strap is gripped or clamped between two metallic cross bars and after tension is applied to the strap to effect a clamping engagement between the frames on the strap a subsequent adjustment is not readily obtained because little co-operation may be had from the member clamped. The locked condition is only relieved by manual movement of the frames. In the present construction employing an elastic or fabric strap, such manual movement of the frame members relative to each other is not necessary since the frames are automatically relieved to such an extent that they may be adjusted together along the strap. This condition is pronounced in the form wherein a covering of resilient material is disposed about the cross bar and the resilient material engages one face of the strap, the other face of the strap engaging the cross bar of the other frame.

The resilient material employed as a covering for the cross bar of one of the frames may be a portion of the strap which is threaded between the co-operating cross bars or it may be a separate fabric strip looped around one of the cross bars and attached directly to the garment to be supported. In the first mentioned instance the strap may extend around the cross bar of one of the frames and directed between the co-operating cross bars from a looped portion of the strap to be clamped thereby, the loop being employed as a means for supporting a buckle attachment or other member secured to the garment to be supported, with the free end of the strap passing through a slot in the other of the frames and extending upwardly therefrom for encircling the leg of a user or passing over a shoulder of the user in whatever respect it is worn. In the second instance of use where a separate strip of fabric is employed to extend around one of the co-operating cross bars and for attachment to the garment to be supported, a strap extends from its position over the shoulders or about the leg through the slot of the other frame and between the co-operating cross bars with the free end hanging straight downwardly.

One embodiment of this invention consists in the provision of side bars and cross bars forming at least one slot in each of the frames with co-operating cross bars for clamping a strap in adjusted positions therebetween by a relative longitudinal movement of the frames, the other cross bar of one of the frames being employed for anchoring one end of the strap or a separate fabric piece. In this embodiment, the member secured to the cross bar passes behind the other cross bar or strap-engaging bar so that the back of the buckle is entirely covered by fabric. In this manner no metal or hard substance is exposed to rub against the clothes in the instance of use as a suspender, or against the leg in the case of a hose supporter or men's garter.

When one end of the strap or when a separate piece of fabric is employed about the gripping bar of one of the frames that material cannot bunch or slide from one side to the other as is often the case when ribbon is wrapped about a bar. The ribbon or strap is held in place by the gripping bar which grips both the strap that is anchored through as well as the strap that passes therebetween. The strap in both instances is held smooth and tight.

In all instances the back of the strap hides the buckle from view with the exception of a thin margin on each side thereof. This is a distinct advantage in connection with lingerie, corselets, brassières and other dainty wear where every effort is made to make the adjustment hardware as inconspicuous as possible.

One of the objects of this invention is to provide a buckle of the character indicated above having relatively slidable frame members in which the strap threaded therethrough may be conveniently and easily adjusted in either direction.

Another object of this invention is to provide a buckle having relatively slidable frame members as hereinabove pointed out in which a minimum of the buckle is exposed to view and the back of the frames are covered by a portion of the strap.

A further object of this invention is to provide a buckle having relatively slidable frame members of the type hereinabove described in which one of the co-operating cross bars clampingly engaging the strap is covered with a resilient material to prevent sliding or bunching of the strap on one side of the frame.

It is also an object of this invention to provide a buckle having relatively slidable frame members in which the construction may be relatively inexpensive to manufacture, may be durable, and may be simple in construction in threading and in manipulation.

Other objects and advantages of this invention will hereinafter be more particularly pointed out and for a more complete understanding of the characteristic features of this invention, reference may now be had to the following description when taken together with the accompanying drawings, in which latter—

Figures 1, 2, 3, 4 and 5 are diagrammatic views illustrating the threading of the various forms of buckles embodying the features of this invention;

Fig. 6 is a front elevational view of the buckle embodiment shown in Fig. 1 of the drawings with a fragmentary portion of the strap threaded therethrough;

Fig. 7 is an enlarged central vertical sectional view taken on the line 7—7 of Fig. 6;

Fig. 8 is a perspective view of the co-operating buckle frames of Fig. 7, the frames being separated;

Fig. 9 is an enlarged sectional view similar to Fig. 7 of the modified form of buckle construction shown in Fig. 2 embodying the features of this invention;

Fig. 10 is a perspective view of the frame members of the buckle shown in Fig. 9, the frames being shown in a disassembled relation;

Fig. 11 is an enlarged sectional view similar to Fig. 9 of the embodiment shown in Fig. 3 of the drawings, incorporating the features of this invention;

Fig. 12 is a perspective view of the frame members of Fig. 11, the frames being shown in a disassembled relation;

Fig. 13 is a front elevational view of the modified form of buckle construction illustrated in Fig. 4 of the drawings, the buckle being shown as mounted on a fragment of a strap;

Fig. 14 is an enlarged central vertical sectional view taken on the line 14—14 of Fig. 13;

Fig. 15 is a perspective view of the frame members of Fig. 14, the members being shown in a disassembled relation;

Fig. 16 is an enlarged sectional view similar to Fig. 14 of the buckle shown in Fig. 5 of the drawings, incorporating the features of this invention; and Fig. 17 is a perspective view of the frame members of Fig. 16, the members being shown in a disassembled condition.

Referring now to the drawings and more particularly to Figs. 1, 6, 7 and 8 thereof, the construction therein shown comprises a pair of frame members 20 and 21, the frame member 20 being substantially rectangular and having side bars 22 and 23 connected by cross bars 24 and 25. The cross bar 24 extends preferably laterally out of the normal plane of the frame to receive the looped end of a strap 26 which is secured thereto preferably by stitching. The cross bar 25 is provided with an inclined surface 27 extending in the opposite direction to the offset of the bar 24, the upper edge of the inclined surface having a notch 28 disposed substantially centrally thereof.

The frame 21 is likewise substantially rectangular in shape and comprises spaced side bars 29 and 30 connected by cross bars 31, 32 and 33 defining substantially rectangular slots 34 and 35. The side bars 29 and 30 are preferably of channel-shaped cross section to receive in slidable engagement therewith the side bars 22 and 23 of the frame 20.

The cross bar 32 is provided with an inwardly directed projection 36 in the path of movement of the notch 28 of the inclined bar 27 for limiting the relative longitudinal movement of the frames in one direction. A strap 37 of fabric, elastic or other resilient material, is threaded behind the bar 31 forwardly through the slot 34 over the bar 32 and rearwardly therefrom through the slot 35 between the cross bar 33 and the inclined cross bar 27 with the free end hanging downwardly therefrom.

The frame members 20 and 21 when in an assembled condition co-operate to clamp the strap 37 in various adjusted positions. In Fig. 7 the strap is shown as being clampingly held between the co-operating cross bars 27 and 33, there being a tension on the strap 37 in the direction of the arrow A against the strap 26 supporting an object affording resistance in the direction of the arrow B for directing a relative longitudinal movement of the frame members in opposite directions. The frame 21 moves upwardly with the strap 37 and the frame 20 remains in a fixed position relative to the article to be supported.

In the instance of Fig. 1, the looped strap 26 is secured to a slip 38 by means of the stitches 39. The frame having the cross bars 24 and 27 faces front with the free end of the strap 37 passing to the rear of the slip 38. The cross bar 31 is hidden from view by the strap 37 and the cross bars 24 and 27 are hidden from view by the fabric piece 26. The only part of the buckle that is exposed to view is the extending side edges 29 and 30 which, of course, is not particularly objectionable. The present embodiment of buckle may, however, be employed with straps in the manner illustrated in any of the other figures of the drawings, it being considered not desirable nor essential to repeat various manners of attaching straps to articles.

Referring now more particularly to Figs. 2, 9 and 10, the construction therein shown comprises a pair of frame members 40 and 41, the frame member 40 being substantially rectangular, having side bars 42 and 43 connected by cross bars 44, 45 and 46 defining substantially rectangular slots 47 and 48. The side bars 42 and 43 are preferably of channel-shaped cross section to act as guideways and the cross bar 45 is split to facilitate threading of a strap through the slots 47 and 48.

The frame 41 is likewise substantially rectangular in shape and comprises side bars 49 and 50 connected by a cross bar 51 which latter is inclined with respect to the plane of the frames and thereby lies in a plane across the path of movement of the cross bar 46 of the frame 40. The side bars 49 and 50 are received in the channel-shaped guides of the side bars 42 and 43 to direct a relative longitudinal movement of the frames 40 and 41.

The inclined cross bar or gripping bar 51 of the frame 41 co-operates with the cross bar 46 of the frame 40 to clampingly hold a strap 52 of fabric, elastic or other resilient material, therebetween, the strap extending behind the cross bar 44 forwardly through the slot 47 over the cross bar 45 and rearwardly therefrom through the slot 48 between the co-operating cross bars 46 and 51 with the free end extending below the frames. In this embodiment the strap 52, after passing through the frames, is shown as being looped through an eyelet 53 and extends to be wrapped around the gripping bar 51, the free end of the strap being stitched as at 54 in a fixed relation with the gripping bar 51. A looped strap 55, secured by means of stitches 56 to a slip or the like 57, likewise passes through the eyelet 53.

Referring now more particularly to Fig. 9, it will be noted that the strap 52 is employed as a covering for the gripping bar 51 and engages another portion of the strap 52 when the gripping bar 51 co-operates with the cross bar 46 to clampingly hold the strap between the frame members as tension is applied to the strap by weight of the article to be supported. The strap 52 when employed for use as a suspender, supporter, garter or the like, is preferably of elastic, and when used in supporting lingerie, corselets, brassières and the like, is preferably of silk, tape or the like. In either instance, however, the material is more or less resilient and so long as tension is applied to the strap, a wedge-like grip is retained on the strap between the gripping bar 51 and the co-operating cross bar 46. However, upon release of tension the elastic material seeks to return to its normal condition and automatically overcomes the wedge-like grip so that the slidably engaged frames of the buckle can be readily adjusted.

Referring now more particularly to Figs. 3, 11 and 12, the buckle therein shown comprises a pair of frame members 58 and 59, the frame member 58 being of substantially rectangular shape and having side bars 60 and 61 connected by spaced cross bars 62 and 63 to define a substantially rectangular slot 64. The side bars 60 and 61 are preferably provided with integrally formed spaced ledges 60*a* and 61*a* respectively to form channels to act as guides to receive in slidable engagement therewith the frame 59, as will hereinafter be more particularly described.

The frame 59 preferably comprises a pair of side bars 65 and 66 connected by a cross bar 67. The side bars 65 and 66 slidably engage the channel guideways of the side bars 60 and 61 of the frame 58 so as to provide relative longitudinal movement between the frames 58 and 59.

The cross bar 62 of the frame 58 is preferably inclined with respect to the normal plane of the frame 58 as determined by the channel-shaped guides of the side bars 60 and 61. The cross bar 67 preferably lies in the plane of the side bars 65 and 66, and the inclined cross bar 62 extends in a plane across the path of movement of the cross bar 67 as shown more particularly in Figs. 3 and 11.

A strap 68 of fabric, elastic or other resilient material, extends between the inclined cross bar 62 and the cross bar 67 and through the slot 64 over the cross bar 63, the free end being looped back upon itself and passing around the cross bar 67 to be secured thereto by stitches 69. The loop of the strap 68, as shown in Fig. 3, passes through the eye of a fastener 70, the fastener 70 in turn being detachably connected on a stud 71 secured to lingerie or the like 72. This connection with an article to be supported is merely illustrative of one of the many forms of attachment to which the present buckle may be adapted.

Referring now more particularly to Figs. 4, 13, 14 and 15, the buckle shown therein comprises a pair of slidably engaged frames 73 and 74 disposed in a face-to-face relation, the frame 73 being of substantially rectangular formation having spaced cross bars 75, 76 and 77 connecting side bars 78 and 79 to form substantially rectangular slots 80 and 81. The cross bars 75, 76 and 77 are formed preferably in an arcuate plane so that as will hereinafter more particularly be pointed out, the cross bar 77 will lie in an inclined plane relative to the normal plane of the frame. The side bars 78 and 79 are provided with flanges 82 and 83 preferably formed integrally with the frame in a spaced relation therefrom and extending inwardly in a direction toward each other to provide guides or channels for directing relative longitudinal movement between the frames 73 and 74.

The frame 74 comprises side bars 84 and 85 connected together by means of a cross bar 86. The side bars 84 and 85 are guided by the flanges 82 and 83 to permit relative longitudinal movement between the frames 73 and 74, the frame 74 having longitudinal movement in the normal plane of the frame. The cross bar 77, as above stated, is inclined with respect to the normal plane of the frame and a portion thereof lies in a plane across the path of movement of the cross bar 86 of the frame 74.

A strap 87 of fabric, elastic or other resilient material, is preferably threaded between the frames of the buckle with the free end hanging loosely therebelow, the strap passing behind the cross bar 73 and through the slot 80 in front of the cross bar 76 and thence through the opening 81 between the cross bars 77 and 86.

The cross bar 86 co-operates with the cross bar 77 to hold the strap 87 in various positions of predetermined adjustment. In order to effect an efficient clamping action and yet to permit of the ready adjustment of the frames as a unit along the strap, the bar 86 is covered with a fabric covering as by means of the fabric strip 88, the ends of which are stitched as at 89 to a slip or the like 90 with the intermediate portion thereof looped about the bar 86. The strap 87 therefore is gripped between the inclined cross bar 77 and covering material 88 of the cross bar 86.

The buckle construction shown more particularly in Figs. 5, 16 and 17, comprises a pair of slidably engaged frames 91 and 92 disposed in a substantially face-to-face relation, the frame 91 being substantially rectangular in form and comprising side bars 93 and 94 connected together by spaced cross bars 95, 96 and 97 forming substantially rectangular openings 98 and 99. The cross bars 95, 96 and 97 are preferably formed in an arcuate plane so that the cross bar 97 occupies an inclined position relative to the normal plane of the frame for purposes as will hereinafter be more particularly pointed out. The side bars 93 and 94 are provided with integrally formed flanges 100 and 101 spaced from the frame and extending in a direction inwardly toward each other to form guides or channels for directing relative longitudinal movements between the frames 91 and 92.

The frame 92 is likewise substantially rectangular in shape and comprises side bars 102 and 103 connected by cross bars 104 and 105. The cross bar 104 is offset outwardly in a direction away from the frame 91 when in an assembled condition while the cross bar 105 extends in the plane of the frame. The lower edge 106 of the cross bar 105 is preferably inclined from the plane of the frame to substantially the same degree as the inclination of the cross bar 95 with respect to the plane of the frame.

When the frames 91 and 92 are in an assembled relation the cross bar 97 of the frame 91, by reason of its inclined relation to the plane of the frame, has a portion thereof lying in a plane in the path of movement of the cross bar 105, the cross bars 97 and 105 co-operating to clamp a strap 107 therebetween upon relative longitudinal movement between the frames 91 and 92, the strap being of fabric, elastic or resilient material. The frames 91 and 92 are guided in their relative longitudinal movement by the side bars 102 and 103, the latter being received within the channels of the frame 91 behind the flanges 100 and 101.

The strap 107 extends behind the cross bar 95 of the frame 91 outwardly through the slot 98 and in front of the cross bar 96 and thereafter through the opening 99 and between the cooperating cross bars 97 and 105. The strap, as shown more particularly in Fig. 5, thereafter passes from the frame to a looped portion, the free end extending around the offset bar 104 to which it is secured as by means of the stitches 108. The loop of the strap 107 passes through an eyelet 109, the eyelet in turn receiving a fabric or other strip 110 secured as by means of stitches to a slip or the like 111. As in the previously described embodiments of this invention, a tension on the strap 107 operates the frames 91 and 92 in opposite directions to effect a clamping engagement between the cross bars 97 and 105. The strap 107, by reason of its passing behind the cross bar 105 and being secured about the cross bar 104, provides a fabric backing for the buckle so that no part of the buckle may come into contact with the means to which it is secured.

In the several embodiments of this invention shown and described, the strap threaded through the frames are clamped in adjusted position by co-operating cross bars of the frames automatically upon a relative longitudinal movement of the frames induced by tension applied to the strap. In one teaching of the invention, the strap is clamped between the co-operating cross bars, one of the cross bars being covered by a fabric material which may be a separate piece or the strap itself. In another teaching of this invention, the co-operating cross bars are not covered, the free end of the strap extending behind one of the co-operating cross bars for attachment to a separate cross bar.

While several embodiments of this invention are herein shown and described, it is to be understood that various modifications thereof may be apparent to those skilled in the art without departing from the spirit and scope of this invention and, therefore, the same is only to be limited by the scope of the prior art and the appended claims.

I claim:

1. A slide buckle, comprising a pair of slidably engaged frames lying in a face-to-face relation, including co-operating cross bars on said frames, one of said co-operating cross bars being inclined in a plane across the path of movement of the cooperating cross bar on the other frame to clamp a strap threaded therebetween in adjusted positions upon a relative longitudinal movement of said frames, and a cover of resilient material for one of said co-operating cross bars for engagement with said strap, said cover and strap being clamped between said co-operating cross bars.

2. A slide buckle, comprising a pair of slidably engaged frames lying in a face-to-face relation, including co-operating cross bars on said frames, one of said co-operating cross bars being inclined in a plane across the path of movement of the cooperating cross bar on the other frame to clamp a strap threaded therebetween in adjusted positions upon a relative longitudinal movement of said frames, and a cover of fabric for one of said cooperating cross bars for engagement with said strap, said cover and strap being clamped between said co-operating cross bars.

3. A slide buckle, comprising a pair of slidably engaged frames lying in a face-to-face relation, including co-operating cross bars on said frames, one of said co-operating cross bars being inclined in a plane across the path of movement of the cooperating cross bar on the other frame to clamp a strap threaded therebetween in adjusted positions upon a relative longitudinal movement of said frames, and a cover of elastic material for one of said co-operating cross bars for engagement with said strap, said cover and strap being clamped between said co-operating cross bars.

4. A slide buckle, comprising a pair of slidably engaged frames lying in a face-to-face relation, one of said frames having spaced side bars and spaced cross bars connecting said side bars for defining an opening for receiving a strap threaded therethrough, the other of said frames including a cross bar for co-operating with one of said cross bars on the other frame, one of said co-operating cross bars being inclined in a plane across the path of movement of the other co-operating cross bar to clamp said strap in adjusted positions therebetween upon a relative longitudinal movement of said frames, and a cover of resilient material for one of said co-operating cross bars for engagement with said strap, said cover and strap being clamped between said co-operating cross bars.

5. A slide buckle, comprising a pair of slidably engaged frames lying in a face-to-face relation, one of said frames having spaced side bars and spaced cross bars connecting said side bars for defining an opening for receiving a strap threaded therethrough, the other of said frames including a cross bar for co-operating with one of said cross bars on the other frame, one of said co-operating cross bars being inclined in a plane across the path of movement of the other co-operating cross bar to clamp said strap in adjusted positions therebetween upon a relative longitudinal movement of said frames, and a fabric strip secured to an article to be supported and looped around one of said co-operating cross bars for engagement with said strap, said strip and strap being clamped between said co-operating cross bars.

6. A slide buckle, comprising a pair of slidably engaged frames lying in a face-to-face relation, one of said frames having spaced side bars and spaced cross bars defining an opening therethrough, the other of said frames including a cross bar cooperating with one of said cross bars on the other frame, one of said co-operating cross bars being inclined in a plane across the path of movement of the other co-operating cross bar, and a strap enveloping one of said co-operating cross bars and extending therefrom into a loop portion and thereafter between said co-operating cross bars to be clamped thereby upon relative longitudinal movement of said frames.

7. A slide buckle, comprising a pair of slidably engaged frames lying in a face-to-face relation, one of said frames having spaced side bars and spaced cross bars defining an opening therethrough, the other of said frames including a gripping bar cooperating with one of said cross bars on the other frame, one of said co-operating bars being inclined in a plane across the path of movement of the other co-operating bar, and a strap having one end enveloping and being secured to said gripping bar and extending therefrom into a loop portion and thereafter between said gripping bar and said co-operating cross bar to be clamped thereby upon relative longitudinal movement of said frames, the free end of the strap passing through the opening in the frame.

8. A slide buckle, comprising a pair of slidably engaged frames lying in a face-to-face relation, said frames having spaced side bars and spaced cross bars connecting said side bars for defining slots, a cross bar on one of said frames being inclined in a plane across the path of movement of one of the cross bars of the other frame to co-operate therewith to clamp a strap threaded therethrough in various positions of adjustment, and a fabric strip enveloping one of the other cross bars of one of the frames and extending therefrom beyond the other cross bar of that frame for attachment with an article to be supported.

9. A slide buckle, comprising a pair of slidably engaged frames lying in a face-to-face relation, one of said frames having spaced side bars and spaced cross bars connecting said side bars for defining a pair of openings to receive a strap threaded therethrough, the second of said frames having spaced side bars and spaced cross bars connecting said side bars, a cross bar of one of said frames being inclined in a plane across the path of movement of said frames for co-operation with a cross bar of the other of said frames to clamp the strap threaded therebetween in adjusted positions upon a relative longitudinal movement of said frames, said inclined cross bar having a notch for engaging a stop in a cross bar of the other of said frames to limit the relative movement of the frames in one direction and the co-operating cross bars limiting the relative movement of the frames in the other direction, one end of said strap being secured to the cross bar of the second frame and extending behind the co-operating cross bar of that frame to form a loop and therefrom between the co-operating cross bars through the openings of the first frame.

10. A slide buckle, comprising a pair of slidably engaged frames lying in a face-to-face relation, one of said frames having spaced side bars and spaced cross bars connecting said side bars for defining a pair of openings to receive a strap threaded therethrough, the second of said frames having spaced side bars and spaced cross bars connecting said side bars, a cross bar of one of said frames being inclined in a plane across the path of movement of said frames for co-operation with a cross bar of the other of said frames to clamp the strap threaded therebetween in adjusted positions upon a relative longitudinal movement of said frames, said inclined cross bar and a second cross bar on the other of said frames engaging to limit the relative movement of the frames in one direction and the co-operating cross bars limiting the relative movement of the frames in the other direction.

11. A slide buckle, comprising a pair of slidably engaged frames lying in a face-to-face relation, one of said frames having spaced side bars and spaced cross bars connecting said side bars for defining a pair of openings to receive a strap threaded therethrough, the second of said frames having spaced side bars and spaced cross bars connecting said side bars, a cross bar of one of said frames being inclined in a plane across the path of movement of said frames for co-operation with a cross bar of the other of said frames to clamp the strap threaded therebetween in adjusted positions upon a relative longitudinal movement of said frames, and interengaging means including a part on one frame projecting into the path of movement of the other frame for limiting the relative movement of the frames in one direction, said co-operating cross bars limiting the relative movement of the frames in the other direction.

12. A slide buckle, comprising a pair of slidably engaged frames lying in a face-to-face relation, one of said frames having spaced side bars and spaced cross bars connecting said side bars for defining a pair of openings to receive a strap threaded therethrough, the second of said frames having spaced side bars and spaced cross bars connecting said side bars, a cross bar of one of said frames being inclined in a plane across the path of movement of said frames for co-operation with a cross bar of the other of said frames to clamp the strap threaded therebetween in adjusted positions upon a relative longitudinal movement of said frames, and interengaging means including a part on one frame projecting into the path of movement of the other frame for limiting the relative movement of the frames in one direction, said co-operating cross bars limiting the relative movement of the frames in the other direction, one end of said strap being secured to the cross bar of the second frame and extending behind the co-operating cross bar of that frame to form a loop and therefrom between the co-operating cross bars through the openings of the first frame.

PAUL W. WHITE.